United States Patent [19]

Byon

[11] Patent Number: 5,645,136
[45] Date of Patent: Jul. 8, 1997

[54] DEVICE FOR OPERATING A SIDE AIRBAG

[75] Inventor: Sung-Kwang Byon, Seoul, Rep. of Korea

[73] Assignee: Daewoo Electronics Co., Ltd., Seoul, Rep. of Korea

[21] Appl. No.: 534,431

[22] Filed: Sep. 27, 1995

[30] Foreign Application Priority Data

Sep. 28, 1994 [KR] Rep. of Korea ............ 94-24441
Sep. 28, 1994 [KR] Rep. of Korea ............ 94-24446

[51] Int. Cl.⁶ .................................... B06R 21/32
[52] U.S. Cl. .................... 180/274; 280/735; 340/436; 340/593; 337/140
[58] Field of Search ........................ 280/735, 734, 280/730.2, 730.1; 180/274; 340/436, 593, 594; 337/140

[56] References Cited

U.S. PATENT DOCUMENTS

| | | | |
|---|---|---|---|
| 2,487,156 | 11/1949 | Luttge et al. | 340/593 |
| 2,806,918 | 9/1957 | Lautzenhiser | 337/140 |
| 3,594,674 | 7/1971 | Willson | 337/140 |
| 5,307,896 | 5/1994 | Taguchi et al. | 280/735 |

FOREIGN PATENT DOCUMENTS

| | | | |
|---|---|---|---|
| 5-254383 | 10/1993 | Japan | 280/735 |
| 2225660 | 6/1990 | United Kingdom | 280/735 |

*Primary Examiner*—Brian L. Johnson
*Assistant Examiner*—Peter C. English
*Attorney, Agent, or Firm*—Lowe, Price, LeBlanc & Becker

[57] ABSTRACT

A device for operating a side airbag is capable of rapidly deploying the side airbag and utilizing a physical collision force without an ECU. The device comprises a U-shaped beam deformed in the event of a crash to generate heat, a plurality of pairs of plate springs fixed along an inner base surface of the U-shaped beam at a predetermined interval, a thin metal plate fixed on the ends of each of the pairs of plate springs, a shape memory alloy member being capable of bending the pair of plate springs against resilient force thereof at a transformation temperature, and connecting the pair of plate springs, a contact electrically connected to the squib and being in contact with the thin metal plate by the deformation of the shape memory alloy member, and a temperature holding portion for constantly keeping the temperature of the U-shaped beam lower than the transformation temperature of the shape memory alloy member.

4 Claims, 5 Drawing Sheets

DEVICE FOR OPERATING A SIDE AIRBAG

BACKGROUND OF THE INVENTION

1. Field of the Invention

The present invention relates to a device for operating a side airbag, and more particularly to a device for operating a side airbag with a simple structure which does not include an electronic control unit (hereinafter referred to as "ECU") for determining whether the airbag has to be deployed or not.

2. Description of the Prior Art

To protect occupants of a vehicle in the event of a collision, various safety devices have been developed. An airbag system, one of the safety devices, prevents the occupants from directly colliding with a solid body of the vehicle by means of an inflated airbag. The airbag system generally comprises a crash sensing portion such as an accelerometer, an ECU for determining whether the airbag has to be deployed or not and connected to the crash sensing portion to receive a signal therefrom, a gas generating portion for generating gas in response to an airbag deploying signal outputted from the ECU, and an airbag module for deploying with gas generated from the gas generating portion. The gas generating portion is formed of a squib for receiving the airbag deploying signal to explode and an inflator for generating gas to inflate the airbag module. The squib is exploded by the airbag deploying signal received, and thus the inflator is also exploded to generate gas.

Currently, in order to protect occupants in the event of a side collision as well as a front collision, it is a general tendency that a side airbag is installed additionally. Meanwhile, the time required to fully deploy a side airbag after collision should be shorter than the time required to fully deploy the front airbag, because a distance between front-seat occupants and a front vehicle body is longer than the distance between the front-seat occupants and a side vehicle body. Therefore, 5"-30 ms standard (See David S. Breed & Vittbrio Castelli, "Problems in Design & Engineering of Air Bag Systems", SAE Technical Paper Series #880724 p. 1–30, 1988.) for a front airbag system can not be used in a side airbag system.

To protect occupants from collision in the side airbag system, the determination whether the airbag is to be deployed should be completed within 15 ms from collision. Because of this reason, an ECU of 16 bits or above is utilized in the side airbag system, while an ECU of 8 bits is generally used in the front airbag system. With the ECU of 16 bits or above, the side airbag system becomes expensive. Also, in spite of using the ECU of 16 bits or above, there is the possibility that the determination time becomes long, because data to be processed in the ECU could be suddenly increased, whereby the reliability of the airbag system is deteriorated.

SUMMARY OF THE INVENTION

The present invention is devised to solve the foregoing problem. An object of the present invention is to provide a device for operating a side airbag being capable of rapidly deploying the side airbag and utilizing a physical collision force without an ECU.

To achieve the above object of the present invention, there is provided a device for operating a side airbag according to a first embodiment of the invention, the device comprising:

a U-shaped beam installed inside the body of a door, electrically connected to the squib and deformed in the event of a crash to generate heat;

a plurality of pairs of plate springs fixed along an inner base surface of the U-shaped beam at a predetermined interval, the pair of plate springs being fixed opposingly in the direction perpendicular to the length direction of the U-shaped beam;

a thin metal plate fixed on the ends of each of the pairs of plate springs to connect the pair of plate springs;

a shape memory alloy member being capable of bending the pair of plate springs against resilient force thereof at a transformation temperature, and connecting the pair of plate springs;

a contact installed at a distance apart from the thin metal plate, electrically connected to the squib and coming into contact with the thin metal plate by the deformation of the shape memory alloy member, the deformation being caused by heat generated from the U-shaped beam in the event of a crash; and a temperature holding portion including a heating member installed on the U-shaped beam, a temperature sensor sensing the temperature of the U-shaped beam, and a temperature controller controlling the heating member to constantly keep the temperature of the U-shaped beam lower than the transformation temperature of the shape memory alloy member.

Preferably, the transformation temperature of the shape memory alloy member is between 50° C. and 80° C.

The temperature sensor may De a thermocouple. The temperature controller keeps the temperature of the U-shaped beam constant by, for example, on/off control, and the temperature kept by the temperature controller is above the inner maximum temperature capable of being attained within a door.

To achieve the above object of the present invention, there is provided a device for operating a side airbag according to a second embodiment of the invention, the device comprising:

an I-shaped beam installed inside the body of a door, electrically connected to the squib and deformed in the event of a crash;

a plurality of protrusions fixed along an inner base surface of the I-shaped beam at a predetermined interval;

a spring member positioned to be in contact with each of the protrusions, and fixed over both ends of opposing inner walls of the I-shaped beam perpendicular to the inner base surface, the spring member comprising a pair of plate springs, and a pair of spacers fixed therebetween respectively and keeping the pair of plate springs at a constant distance; and a contact installed at a distance apart from the sprang member, electrically connected to the squib and being in contact with the spring member by the deformation of the spring member, which is caused by the deformation of a center wall of the I-shaped beam in the event of a crash.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

The preferred first embodiment of a device for operating a side airbag according to the present invention will be described in detail with reference to FIGS. 1 to 3.

Figure 2:
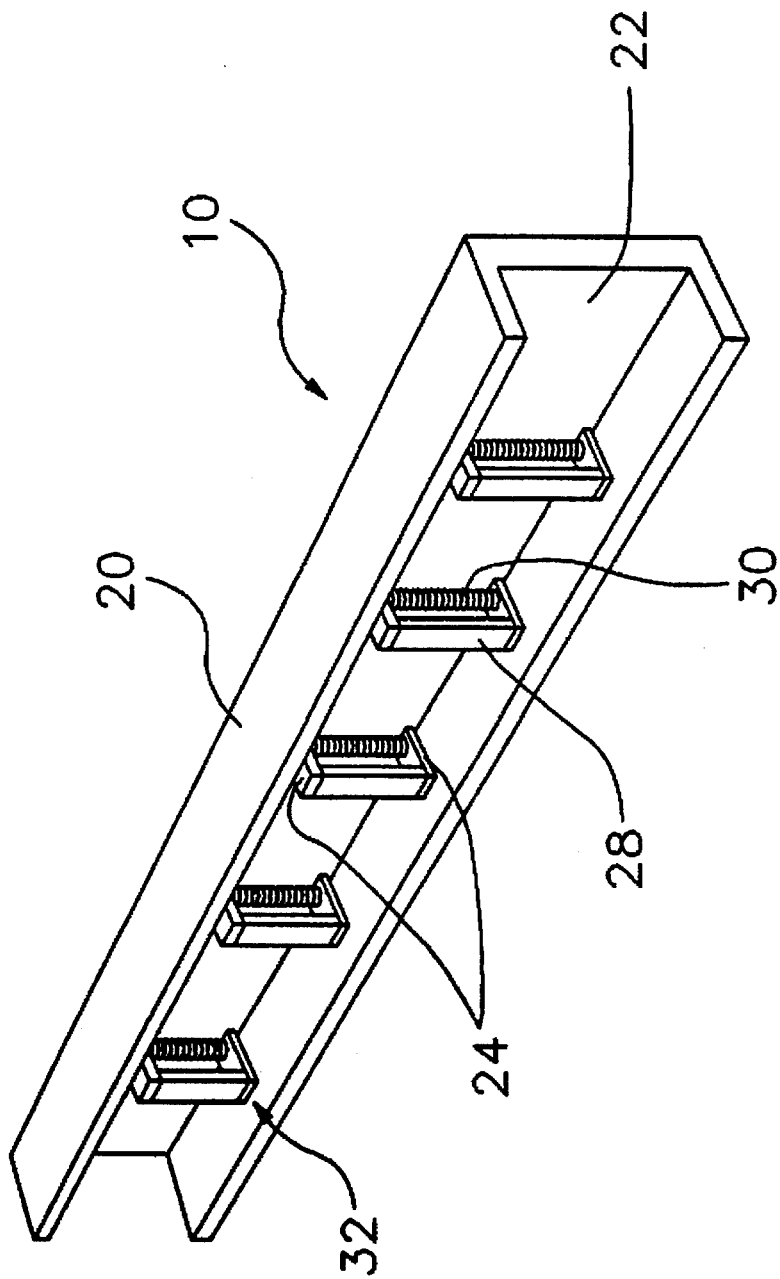
FIG. 2 is a perspective view showing a crash sensing portion of the device according to a first embodiment of the present invention.

In FIG. 2, a crash sensing portion 10 constituting a device for operating a side airbag according to the first embodiment of the present invention is shown. Crash sensing portion 10 is formed of a U-shaped beam 20 and a cap-shaped temperature deforming portion 32. Temperature deforming portion 32 is formed of a pair of plate springs 24, a thin metal plate 28 and a shape memory alloy member 30, and one or more temperature deforming portions 32 are installed at a predetermined interval along an inner base surface 22 of U-shaped beam 20. The pair of plate springs 24 are installed parallel to one another, one of the ends of which are welded on inner base surface 22 and the other ends of which are connected to each other by means of thin metal plate 28 welded thereon, Shape memory alloy member 30 has a shape such as a coil and is fixed to connect a pair of plate springs 24.

Temperature deforming portion 32 is made with electrically conductive materials, and U-shaped beam 20 is made with an excellent heat conductive material such as copper. Plate springs 24 are made with steel, and materials of thin metal plate 28 are not limited especially.

Shape memory alloy member 30 may be made with Ti-Ni alloy or Cu-Zn-Al alloy, but materials thereof are not limited especially so long as they have a transformation temperature in a range of 50° to 80° C. The diameter of shape memory alloy member 30 is within 0.1 to 10 mm. Shape memory alloy member 30 has a coil shape, but the shape thereof is not limited especially so long as it is capable of bending plate springs 24 against their resilient force at the transformation temperature.

The transformation temperature of shape memory alloy member 30 is determined so that the transformation temperature is higher than an attainable temperature within the door in which the device for operating a side airbag according to the present invention is installed, whereby an erroneous deployment of the airbag is prevented.

Figure 1:
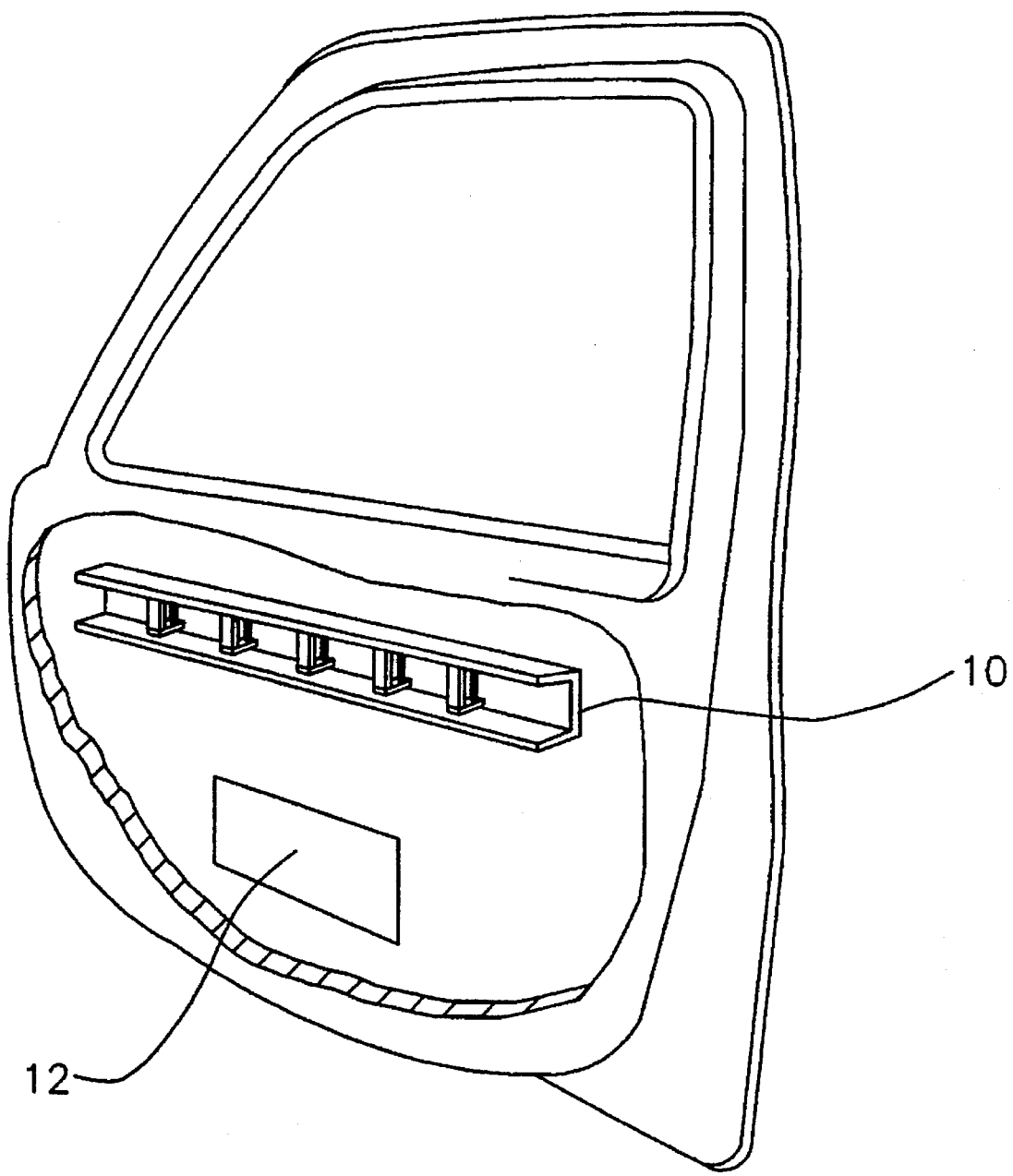
FIG. 1 is a perspective view showing a door in which a device for operating a side airbag according to the present invention is installed.

With reference to FIG. 1, crash sensing portion 10 is installed along the length direction within the door, and airbag module 12 is installed below crash sensing portion 10. Crash sensing portion 10 shown in FIG. 1 is formed of one U-shaped beam 20 and a plurality of temperature deforming portions 32, but may be formed of a plurality of U-shaped beams 20 and one or more temperature deforming portions 32. The installed position of crash sensing portion 10 is not limited as shown in FIG. 1, and a plurality of U-shaped beams 20 may be installed in the appropriate positions inside the door which may be deformed during a crash.

Figure 3A:
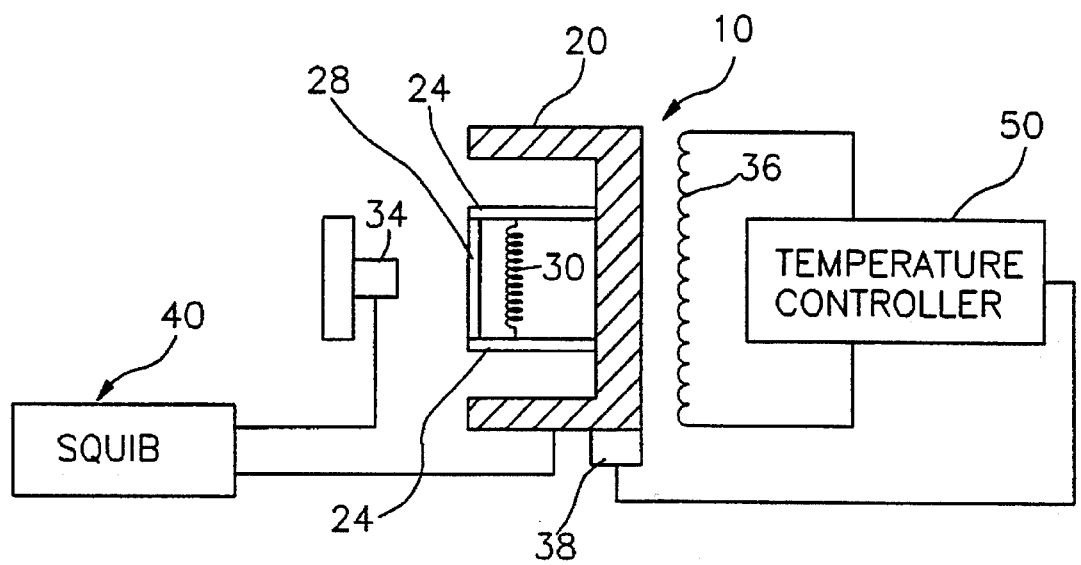
FIGS. 3A and 3B are views showing the operation of a crash sensing portion of the device according to the first embodiment of the present invention, FIG. 3A showing a pre-deformation state of the crash sensing portion, FIG. 3B showing a post-deformation state of the crash sensing portion.

As shown in FIG. 3A, a contact 34 is installed at a distance apart from thin metal plate 28. A squib 40 constituting a gas generator for generating gas to deploy an airbag is electrically connected to contact 34 and crash sensing portion 10.

In addition, it is necessary that the temperature of crash sensing portion 10, for the sake of reliable operation thereof, is kept constantly below the transformation temperature of shape memory alloy member 30 and above the inner maximum temperature capable of being attained within the door since the device for operating a side airbag according to this embodiment includes shape memory alloy member 30. For this purpose, a heating member 36 is installed on U-shaped beam 20, and is electrically connected to a temperature controller 50 for controlling the temperature of U-shaped beam 20. Temperature controller 50 controls heating member 36 by, for example, on/off control. The temperature of U-shaped beam 20 is sensed by temperature sensor 38, such as a thermocouple, electrically connected to the input of temperature controller 50.

When a crash happens, U-shaped beam 20 is deformed in a moment. Heat is caused by this deformation. The heat is transmitted to shape memory alloy member 30 through plate springs 24. When a crash happens at 12 mph or above, the temperature of shape memory alloy member 30 is raised over its transformation temperature. As a result, shape memory alloy member 30 is deformed to draw the pair of plate springs 24 together, whereby thin metal plate 28 is bent toward contact 34 so that thin metal plate 28 comes in contact with contact 34 (See FIG. 3B.). If thin metal plate 28 comes in contact with contact 34, electric power is applied to squib 40 so that the side airbag is deployed.

The deformation of crash sensing portion 10 is associated with the rigid stiffness of the vehicle body, since crash sensing portion 10 according to this embodiment of the invention is installed inside the door. Accordingly, the dimension of crash sensing portion 10 is determined in consideration of the rigid stiffness of the vehicle body so that the side airbag always is deployed under a crash at 12 mph or higher and not deployed under a crash at 8 mph or lower.

Figure 4:
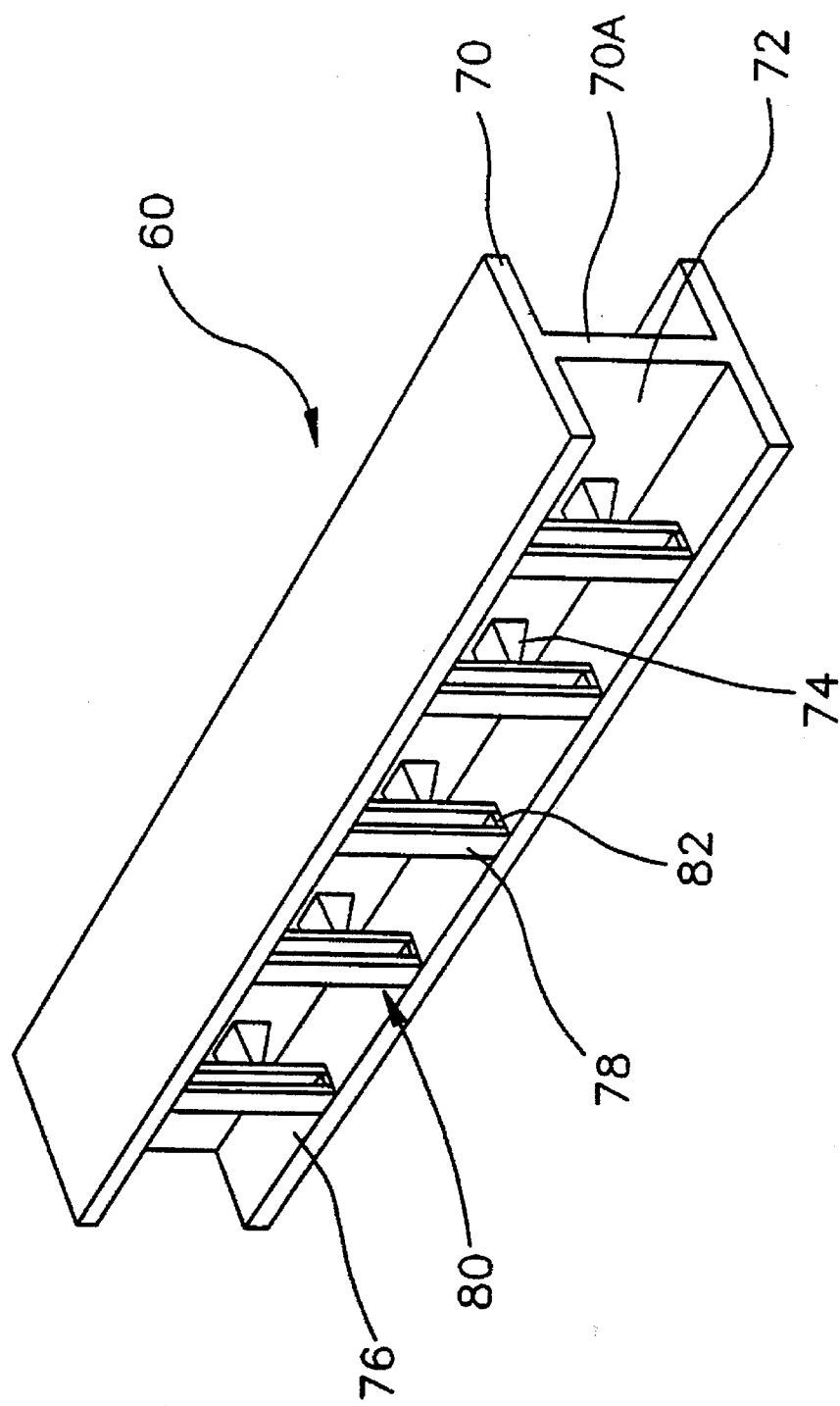
FIG. 4 is a perspective view showing a crash sensing portion of the device according to a second embodiment of the present invention.

With reference to FIGS. 4 and 5, a second embodiment of a device for operating a side airbag according to the present invention will be described in detail, wherein the same reference signs designate the same constituents.

In FIG. 4, a crash sensing portion 60 constituting a device for operating a side airbag according to the second embodiment of the invention is shown. Crash sensing portion 60 is composed of an I-shaped beam 70 and a deforming portion 80 installed along en inner base surface 72 of I-shaped beam 70 at a predetermined interval. Deforming portion 80 is composed of a protrusion 74 fixed along inner base surface 72 at the predetermined interval, a pair of plate springs 78 positioned on protrusion 74 and connecting both ends of a pair of opposing inner walls 76 of I-shaped beam 70, and a pair of spacers 82 fixed between both ends of plate springs 78 to keep the distance between plate springs 78 constant. Also, crash sensing portion 60 should be formed of electrically conductive materials.

Protrusion 74 as shown has a shape of a pyramid, but the shape thereof is not limited especially so long as it is capable of bending plate springs 78 against their resilient force according to the deformation of I-shaped beam 70. Protrusion 74 is welded on inner base surface 72 of I-shaped beam 70.

Spacers 82 are welded between both ends of plate springs 78 respectively. Plate springs 78 may be installed to be in contact with protrusion 74 or not to be in contact with it.

Crash sensing portion 60 according to this embodiment is installed along the length direction of the vehicle door in the same manner as the first embodiment. Crash sensing portion 60 shown in FIG. 4 is formed of one I-shaped beam 70 and a plurality of deforming portions 80, but may be formed of a plurality of I-shaped beams 70 and one or more deforming portions 80. The installed position of crash sensing portion 60 is not limited as shown in FIG. 1, and a plurality of I-shaped beams 70 may be installed in the appropriate positions inside the door which may be deformed during a crash.

Figure 3B:
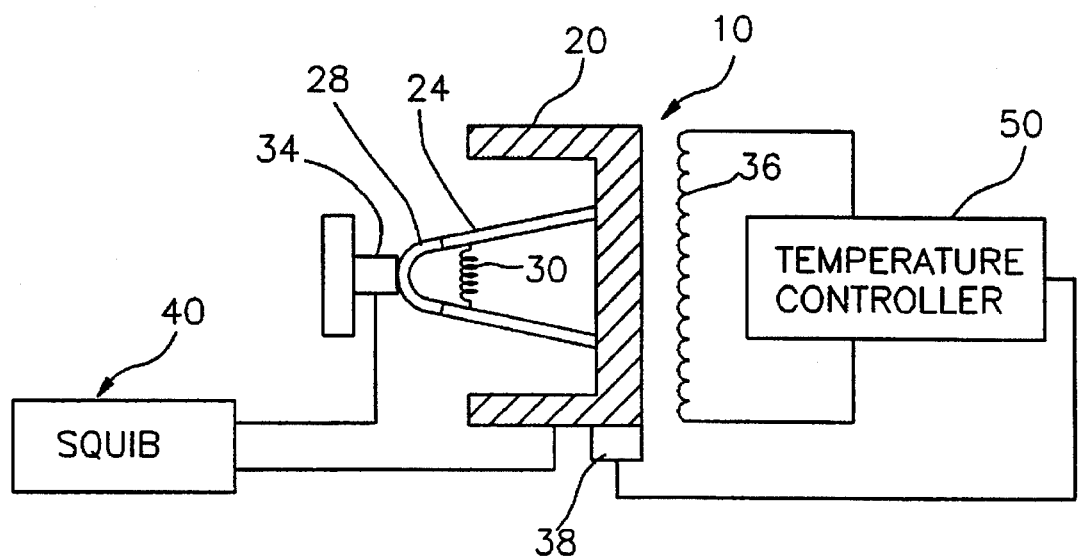
Figure 5A:
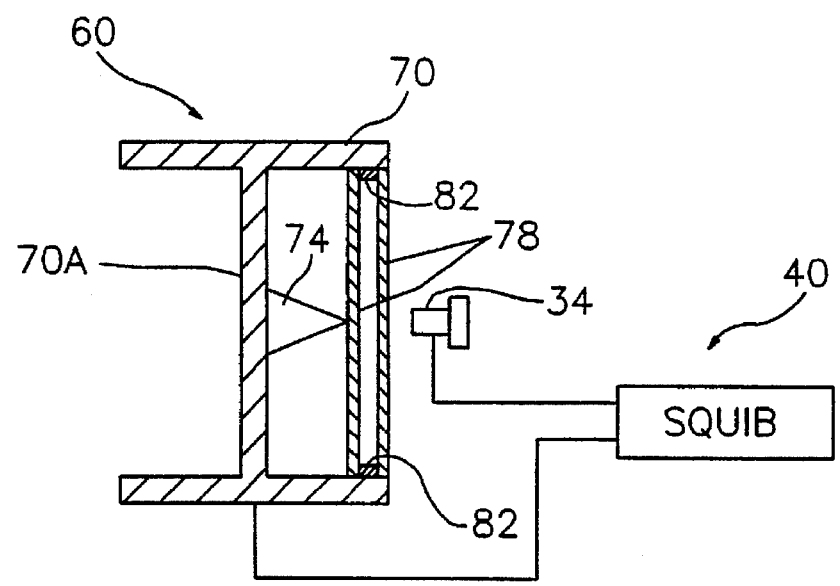
FIGS. 5A and 5B are views showing the operation of a crash sensing portion of the device according to the second embodiment of the present invention, FIG. 5A showing a pre-deformation state of the crash sensing portion, FIG. 5B showing a post-deformation state of the crash sensing portion.
Figure 5B:
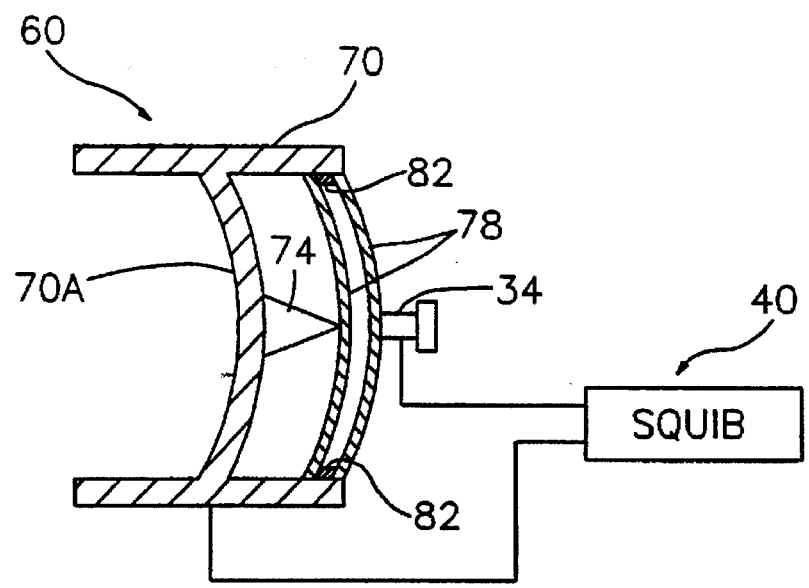

With reference to FIG. 5A, contact 34 is installed at a distance apart from plate springs 78. A squib 40 constituting a gas generator for generating gas to deploy an airbag is electrically connected to contact 34 and crash sensing portion 60. In this embodiment, heating member 36, temperature sensor 38 and temperature controller 50 am shown in FIGS. 3A and 3B aren't required, since a shape memory alloy member is not utilized.

When a crash happens, a center wall 70A of I-shaped beam 70 is deformed toward contact 34. As a result, protrusion 74 presses plate springs 78, whereby plate springs 78 are bent toward contact 34 so that plate springs 78 come in contact with contact 34 (See FIG. 5B.). If plate springs 78 come in contact with contact 34, electric power is applied to squib 40 so that the side airbag is deployed.

The deformation of crash sensing portion 60 is associated with the rigid stiffness of the vehicle body, since crash sensing portion 60 according to this embodiment of the invention is installed inside the door. Accordingly, the dimension of crash sensing portion 60 is determined in consideration of the rigid stiffness of the vehicle body so that the side airbag always is deployed under a crash at 12 mph or higher and not deployed under a crash at 8 mph or lower.

As described above, the device for operating a side airbag according to the present invention has a simple structure and replaces an accelerometer and an ECU as constituents of an airbag system, so that the manufacturing cost of the airbag system is cut down. The airbag system constructed by utilizing the device for operating a side airbag according to the present invention enables an airbag to be deployed more promptly than the existing airbag system including the accelerometer and the ECU, since a time for processing data in the ECU is not required for the airbag system constructed by utilizing the device according to the invention.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In a device for operating a side airbag module comprising a gas generator and a side airbag inflated by gas generated from the gas generator, the gas generator comprising a squib and an inflator, the device comprising:
a U-shaped beam installed inside a vehicle door, electrically connected to said squib and deformed in the event of a crash to generate heat;
a plurality of pairs of plate springs fixed along an inner base surface of said U-shaped beam at a predetermined interval, each of the pairs of plate springs being fixed opposingly in a direction perpendicular to a length direction of said U-shaped beam,
each of the pairs of plate springs having ends connected by a respective thin metal plate,
each of the pairs of plate springs being connected by a respective shape memory alloy member, each of the shape memory alloy members being capable of bending the respective pair of plate springs against resilient force thereof at a transformation temperature;
a contact installed at a distance apart from each of said thin metal plates, electrically connected to said squib and coming into contact with at least one of said thin metal plates by a deformation of the respective shape memory alloy member, the deformation being caused by heat generated from said U-shaped beam in the event of a crash; and
a temperature holding portion including a heating member installed on said U-shaped beam, a temperature sensor sensing the temperature of said U-shaped beam, and a temperature controller controlling said heating member to constantly keep the temperature of said U-shaped beam lower than said transformation temperature of said shape memory alloy members.

2. The device of claim 1, wherein said transformation temperature of said shape memory alloy members is between 50° C. and 80° C.

3. The device of claim 1, wherein said temperature sensor is a thermocouple, said temperature controller keeps the temperature of said U-shaped beam constant by on/off control of said heating member, and the temperature kept by said temperature controller is above an inner maximum temperature capable of being attained within the door.

4. In a device for operating a side airbag module comprising a gas generator and a side airbag inflated by gas generated from the gas generator, the gas generator comprising a squib and an inflator, the device comprising:
a U-shaped beam installed inside a vehicle door, electrically connected to said squib and deformed in the event of a crash to generate heat;
a plurality of pairs of plate springs fixed along an inner base surface of said U-shaped beam at a predetermined interval, each of the pairs of plate springs being fixed opposingly in a direction perpendicular to a length direction of said U-shaped beam,
each of the pairs of plate springs having ends connected by a respective thin metal plate,
each of the pairs of plate springs being connected by a respective shape memory alloy member, each of the shape memory alloy members being capable of bending the respective pair of plate springs against resilient force thereof at a transformation temperature;
a contact installed at a distance apart from each of said thin metal plates, electrically connected to said squib and coming into contact with at least one of said thin metal plates by a deformation of the respective shape memory alloy member, which is caused by heat generated from said U-shaped beam in the event of a crash;
a temperature holding portion including a heating member installed on said U-shaped beam, a temperature sensor sensing the temperature of said U-shaped beam, and a temperature controller controlling said heating member to constantly keep the temperature of said U-shaped beam lower than said transformation temperature of said shape memory alloy members, wherein said transformation temperature of said shape memory alloy members is between 50° C. and 80° C., and wherein said temperature sensor is a thermocouple, said temperature controller keeps the temperature of said U-shaped beam constant by on/off control of said heating member, and the temperature kept by said temperature controller is above an inner maximum temperature capable of being attained within the door.

* * * * *